United States Patent
Suzuki et al.

(10) Patent No.: US 6,595,067 B2
(45) Date of Patent: Jul. 22, 2003

(54) PRESSURE SENSOR USING RESIN ADHESIVE BETWEEN SENSOR ELEMENT AND STEM

(75) Inventors: Yasutoshi Suzuki, Okazaki (JP); Hiroaki Tanaka, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/091,476

(22) Filed: Mar. 7, 2002

(65) Prior Publication Data

US 2002/0148297 A1 Oct. 17, 2002

(30) Foreign Application Priority Data

Apr. 11, 2001 (JP) ........................................ 2001-113079

(51) Int. Cl.⁷ ................................................ G01L 9/16
(52) U.S. Cl. ......................... 73/754; 73/862.68; 73/715
(58) Field of Search .................. 73/754, 708, 721, 73/756, 727, 146.5, 700, 753, 715–728, 862.68

(56) References Cited

U.S. PATENT DOCUMENTS

| | | | | |
|---|---|---|---|---|
| 4,524,625 A | * | 6/1985 | Takeuchi | 310/338 |
| 4,840,067 A | | 6/1989 | Nishida et al. | |
| 4,993,266 A | * | 2/1991 | Omura et al. | 73/720 |
| 5,303,594 A | * | 4/1994 | Kurtz et al. | 338/4 |
| 5,511,428 A | * | 4/1996 | Goldberg et al. | 257/417 |
| 5,583,295 A | * | 12/1996 | Nagase et al. | 73/115 |
| 5,853,020 A | * | 12/1998 | Widner | 137/227 |
| 6,422,088 B1 | * | 7/2002 | Oba et al. | 73/754 |

* cited by examiner

Primary Examiner—Max Noori
Assistant Examiner—Alandra N. Ellington
(74) Attorney, Agent, or Firm—Posz & Bethards, PLC

(57) ABSTRACT

In a pressure sensor made by bonding a sensor chip and a metal stem together with a resin adhesive, fluctuation of the sensor output caused by temperature changes are maximally reduced. The resin adhesive for bonding together the sensor element and the metal stem has a creep characteristic defined as $CR = A \times \sigma^B$ between its creep rate CR and stress σ upon it with A and B being constants. The resin adhesive is selected to satisfy that the constant B is not greater than 3.5.

10 Claims, 4 Drawing Sheets

PRESSURE SENSOR USING RESIN ADHESIVE BETWEEN SENSOR ELEMENT AND STEM

CROSS REFERENCE TO RELATED APPLICATION

This application is based on and incorporates herein by reference Japanese Patent Application No. 2001-113079 filed on Apr. 11, 2001.

FIELD OF THE INVENTION

This invention relates to a pressure sensor for outputting a signal corresponding to an applied pressure by means of a piezo-resistance effect, made by bonding a sensor element to a metal stem.

BACKGROUND OF THE INVENTION

Pressure sensors of this kind have been proposed which, to detect high pressures, are made by bonding a sensor element (sensor chip) made from a semiconductor to a metal stem with a low melting point glass, as disclosed in U.S. Pat. No. 4,840,067.

However, in this pressure sensor, because a low melting point glass is used to bond the sensor chip to the metal stem, heating to a temperature (for example about 480° C.) is necessary. Therefore, this bonding is not suitable for sensor chips which are vulnerable to heat (for example chips with integrated circuit parts).

Resin adhesives are considered to be used for bonding sensor elements to metal stems, as a bonding method which can be implemented at relatively low temperatures. However, when low melting point glass is simply replaced with a resin adhesive, as a result of creep progressing in the adhesive resin with temperature changes, stresses act on the sensor chip, and the output of the sensor fluctuates with time.

SUMMARY OF THE INVENTION

It is therefore an object of the present invention to reduce fluctuations in sensor output caused by temperature changes in a pressure sensor made by bonding a sensor element to a metal stem with a resin adhesive.

The present invention is based on a supposition that, if the progressing of creep which accompanies temperature changes in the resin adhesive were to be slowed, then fluctuation of the sensor output could be reduced. It is known that, in a resin, the relationship between the creep rate CR and the stress σ acting on the resin is given by the following expression.

$$CR = A \times \sigma^B \text{ (where A and B are constants)}$$

According to the present invention, a pressure sensor has a sensor element operable based on the piezo-resistance effect and a metal stem bonded to this sensor element and supporting the sensor element. The sensor element and the metal stem are bonded with a resin adhesive. This resin adhesive has a creep characteristic such that the constant B in the above expression is not greater than 3.5, preferably to be less than 3.0. Thus, sensor output fluctuation could be reduced to a practically tolerable level. Further preferably, the resin adhesive may be made of an imide resin.

BRIEF DESCRIPTION OF THE DRAWINGS

The above and other objects, features and advantages of the present invention will be more fully understood from the following detailed description made with reference to the accompanying drawings. In the drawings.

DETAILED DESCRIPTION OF THE PREFERRED EMBODIMENTS

Figure 1:
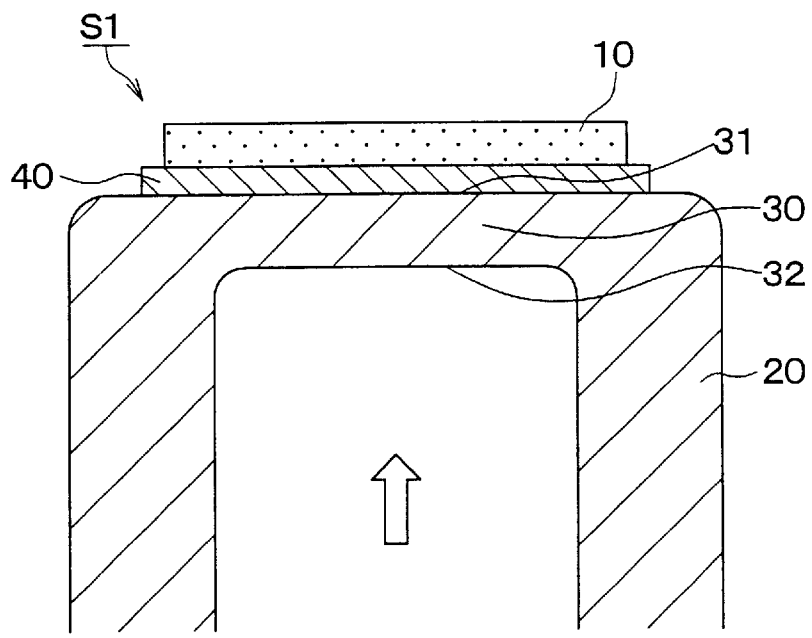
FIG. 1 is a sectional view illustrating a preferred embodiment of a pressure sensor according to the invention.

Referring first to FIG. 1, a pressure sensor S1 is designed for use as a sensor for detecting injection pressure in an injection pressure control system of a diesel engine of an automotive vehicle. The pressure sensor S1 has a sensor chip (sensor element) 10, which is made of a semiconductor and by means of a piezo-resistance effect outputs a signal (sensor signal) corresponding to an applied pressure, and a metal stem 20, which is bonded to this sensor chip 10 and supports the sensor chip 10 thereon.

The metal stem 20 is made of covar, which is a Fi—Ni—Co alloy having about the same coefficient of thermal expansion as glass, or the like, and in this example forms a hollow cylindrical tube made for example by machining. At one end of this metal stem 20, a diaphragm 30 is formed as a thin portion forming for example a flat disc shape.

The sensor chip 10 is made of a monocrystalline semiconductor, and is bonded to one side (the obverse side) 31 of the diaphragm 30 with a resin adhesive 40 made of a thermosetting imide resin. In this example, the sensor chip 10 is a monocrystalline silicon substrate whose plane orientation is (100) and which forms a square plate shape.

The resin adhesive 40 is preferably one whose hardening temperature is 200° C. or less, and is one which in its hardened state has a creep characteristic such that, when its creep rate is defined as V and the stress upon it is defined as σ, the creep rate CR is given by the following expression with A and B being constants. The constant B in this expression is set to be not greater than 3.5.

$$CR = A \times \sigma^B$$

The constant A, in the case of a resin adhesive, is in the range below $10^{-7}$ (the conceivable range in an actual resin adhesive).

In this pressure sensor S1, a medium (gas, liquid, etc.), at a pressure corresponding to the fuel injection pressure of an engine or the like, is introduced through the other end (not shown) of the metal stem 20, as shown by the white arrow in FIG. 1. As a result, a pressure is applied to the other side (reverse side) 32 of the diaphragm 30, and pressure detection is effected on the basis of deformation of the diaphragm 30 and the sensor chip 10.

Here, as the dimensions of the metal stem 20 in this preferred embodiment, for example the external diameter of the cylinder is 6.5 mm; its internal diameter is 2.5 mm; and the thickness of the diaphragm 30 is for example 0.65 mm for measuring 20 Mpa or 1.40 mm for measuring 200 MPa.

The sensor chip 10 is for example a 3.56 mm×3.56 mm square of thickness 0.2 mm.

Figure 2:
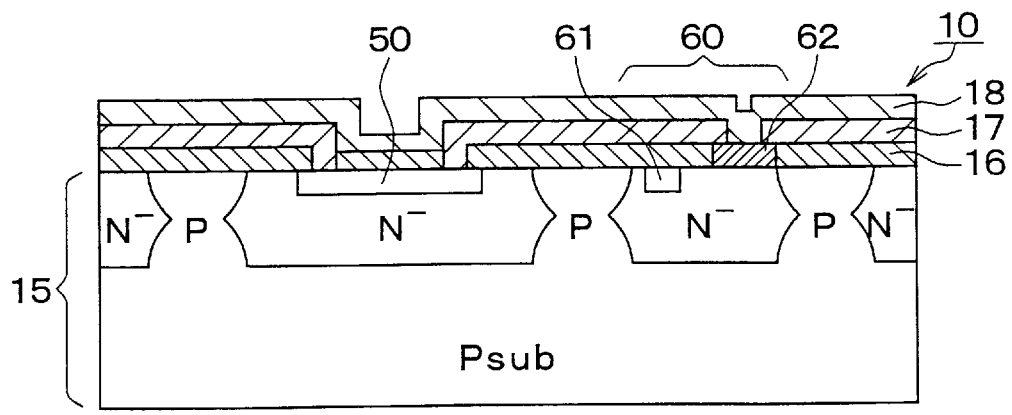
FIG. 2 is a sectional view illustrating a sensor chip used in the pressure sensor shown in FIG. 1.

As shown in FIG. 2, the sensor chip 10 of this preferred embodiment has integrated therewith a piezo-resistor 50 for generating a sensor signal and a circuit part 60 for processing the signal from this piezo-resistor 50.

The sensor chip 10 is a silicon semiconductor substrate 15 made by forming a P-type layer (PSub layer) and an $N^-$-layer (N-type epitaxial layer) in order from the reverse side (the lower side in the figure) to the obverse side (the upper side in the figure), as shown in FIG. 2. Isolation is secured by the $N^-$-layer being divided into a region for forming the piezo-resistor 50 and a region for forming the circuit part 60 by P-type regions having a different impurity concentration from the P-type layer.

Figure 4:
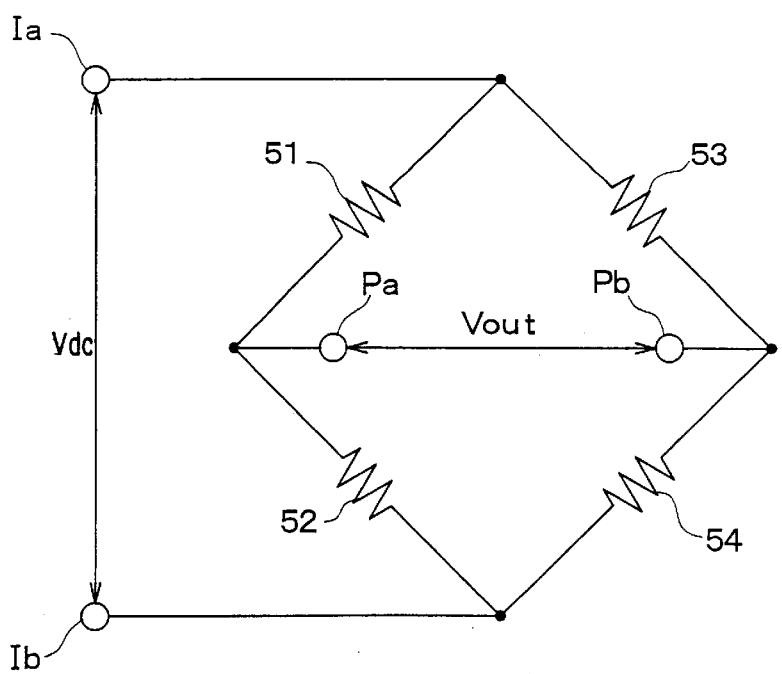
FIG. 4 is a circuit diagram illustrating a bridge circuit of the pressure sensor shown in FIG. 1.

The piezo-resistor 50 is formed as a P-type region inside the $N^-$-layer. In practice at least four such piezo-resistors 50 are formed, and constitute a bridge circuit, which is shown in FIG. 4.

The circuit part 60 is for amplifying and adjusting the sensor signal from the piezo-resistor 50, and is made up of MOS transistor elements and bipolar transistor elements and the like. In FIG. 2, of the circuit part 60 there are shown a potential-fixing layer 61, consisting of an $N^+$-layer, for fixing the potential of the circuit part 60, and a resistance 62, consisting of a CrSi film formed on the surface of the silicon semiconductor substrate 15.

The surface of the silicon semiconductor substrate 15 is covered with an oxide film 16, and on the oxide film 16 are formed interconnections 17 consisting of an Al thin film. Connections among the piezo-resistors 50 and connections between the piezo-resistors 50 and the circuit part 60 are provided by way of the interconnections 17 and contact holes formed in the oxide film 16.

A protective film 18 consisting of a silicon oxide film or a silicon nitride film or the like is formed on the oxide film 16 and the interconnections 17 to protect the sensor chip 10. Although this sensor chip 10 can be fabricated using known semiconductor fabrication technology, an example of a method for fabricating it will be explained with reference to FIGS. 3A through 3F.

Figure 3A:
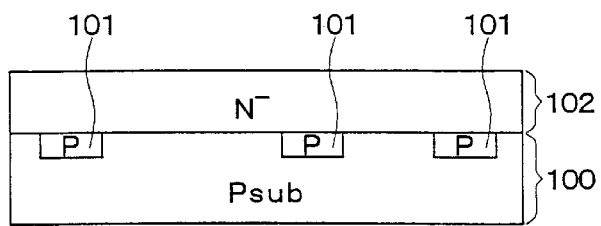
FIGS. 3A through 3F are sectional views illustrating a method for fabricating the sensor chip shown in FIG. 2.

First, as shown in FIG. 3A, by ion-implantation into predetermined regions of one side of a P-type silicon substrate 100, P-type layers 101 of a different impurity concentration are formed. Then, an $N^-$-layer 102 is grown on the same side of the silicon substrate 100 with an impurity atmosphere of phosphorous (P) or the like.

Figure 3B:
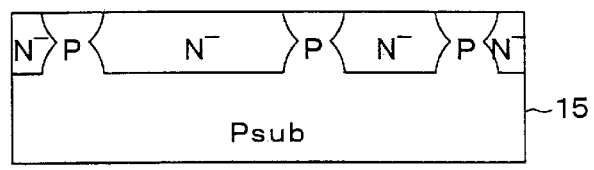

Then, as shown in FIG. 3B, by boron (B) ions or the like being implanted through the surface of the $N^-$-layer 102 and diffused, and the P-type layers 101 being made to diffuse to the $N^-$-layer 102 side, the silicon semiconductor substrate 15 is formed. Thus, in the substrate 15, P-type layers and $N^-$-layers are formed and isolation is provided.

Figure 3C:
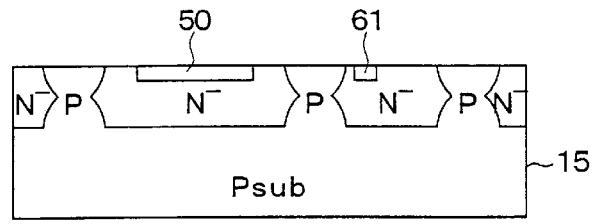
Figure 3D:
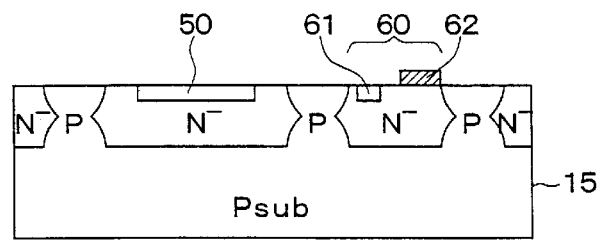

After that, as shown in FIG. 3C, by ion-implantation or a diffusion method, the piezo-resistors 50 and the potential-fixing layer 61 and so on are formed in the surface of the silicon semiconductor substrate 15. Then, as shown in FIG. 3D, the resistor 62 consisting of a CrSi film is formed by vapor deposition in the circuit-forming region of the surface of the silicon semiconductor substrate 15. As a result of the processes illustrated in FIGS. 3C and 3D, the circuit part 60 is formed.

Figure 3E:
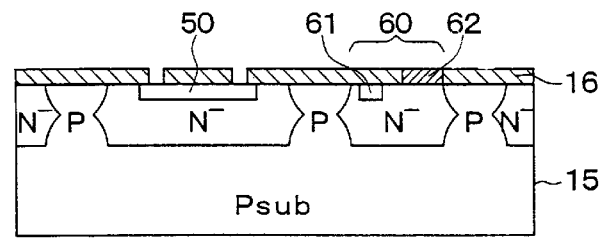

Then, as shown in FIG. 3E, by heat-treatment, the oxide film (thermal oxide film) 16 is formed on the surface of the silicon semiconductor substrate 15, and photolithography or the like is used to form contact holes in required locations in the oxide film 16.

Figure 3F:
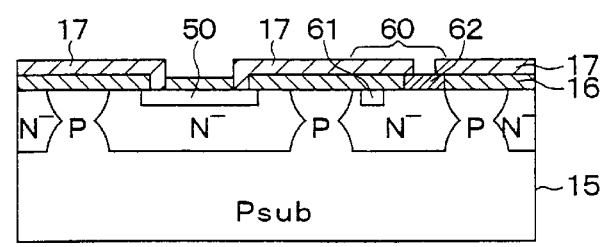

Then, as shown in FIG. 3F, interconnections 17 consisting of an Al thin film are formed by vapor deposition. By CVD or the like, the protective film 18 consisting of silicon oxide or silicon nitride is formed to complete the sensor chip 10 shown in FIG. 2.

The rear side face of this sensor chip 10 is then brought face-to-face with the obverse side 31 of the diaphragm 30 of the metal stem 20, and placed on this obverse face 31 of the diaphragm 30 with the resin adhesive 40 therebetween. The resin adhesive 40 is then hardened by heating (below 200° C.), whereby the pressure sensor S1 shown in FIG. 1 is completed.

The operation of the pressure sensor S1 described above will now be discussed, with reference also to FIG. 4. FIG. 4 is a circuit diagram of a bridge circuit made up of four piezo-resistors 50 (51 through 54) arranged in the Wheatstone bridge.

First, when a pressure is applied in the direction of the white arrow in FIG. 1, the diaphragm 30 and the sensor chip 10 distort. At this time, when a d.c. voltage Vdc is applied across the input terminals Ia and Ib of the Wheatstone bridge, this distortion manifests as resistance changes of the piezo-resistors 51 through 54, and a voltage (sensor signal) Vout at a level corresponding to the pressure being detected is outputted from across the output terminals Pa and Pb.

This sensor signal Vout is amplified and adjusted by the circuit part 60, and outputted to outside as a sensor output via interconnection members (bonding wires and so on) (not shown) connected to the sensor chip 10. In this way, pressure detection is carried out in the pressure sensor S1.

In this embodiment, the resin adhesive 40 bonding together the sensor chip 10 and the metal stem 20 is selected to have a creep characteristic such that the constant B in the expression of the creep rate is not greater than 3.5 (and preferably below 3.0) for the following reasons.

When the resin adhesive 40 has the creep characteristic defined by the above expression, under high-temperature or low-temperature thermal stresses the resin adhesive 40 deforms plastically, and this deformation applies distorting stresses to the sensor chip 10. When this happens, consequently, in a sensor chip which uses a piezo-resistance effect, the sensor output fluctuates.

This suggests that it may be possible to reduce sensor output fluctuations by slowing the progressing of creep which accompanies temperature changes in the resin adhesive 40. That is, by reducing the constant B in the above expression to within a predetermined range, it should be possible to slow the creep rate CR, i.e. the progressing of creep, and thereby reduce sensor output fluctuations caused by temperature changes to a practically acceptable level.

The problematic factors are the fluctuation amplitude and the fluctuation time of the sensor output. Here, a required condition was set that, when the pressure sensor is left in a room-temperature atmosphere after the pressure sensor is left in an atmosphere above or below the room temperature to apply a thermal stress to the pressure sensor, the sensor output must return within two hours to that of before the thermal stress was applied, and there must be no output fluctuation thereafter.

This condition is set based on the following reasons. In the manufacturing method described above, when the sensor chip 10 and the metal stem 20 are bonded together with the resin adhesive 40, they are heated to a maximum of about 200° C. From the productivity point of view, a testing process must be carried out within two hours of the completion of this heating. This testing step is for checking the sensor output characteristics and performing output adjustment and so on. The pressure sensor S1 is mounted to a case in a step after this, but no heat is applied then.

Accordingly, various resin adhesives 40 having different constants A and B in the above expression were prepared for example by changing the composition of the imide resin in the resin adhesive 40, and the sensor output fluctuations of pressure sensors S1 made using these different resin adhesives 40 were tested.

First, the creep characteristics of a resin adhesive are given by the relationship defined by the above expression (where $A<10^{-7}$). This relationship can be derived easily as follows.

That is, heat and tensile stress are applied to a lump of the adhesive, and the stress and extension rate are measured. These measurement results are applied to simplify the following Lawson-Millar Equation, a known equation generally expressing the creep phenomenon. From the actual measurement curves, any three points of load (stress), temperature and extension are selected, and from these, the above relationship between the creep rate CR and the stress $\sigma$ is derived.

$$\log\sigma=(1.118\times10^{-3})\times(7.744-\log CR)T+4.132$$

Here, $\sigma$ is stress, CR is creep rate. The above expression of creep rate CR is produced by rearranging the above expression of log $\sigma$ by setting the absolute temperature T to a fixed temperature (for example, room temperature).

In the above expression of creep rate CR, with the constant A in the range below $10^{-7}$, the constant B was changed to various values and the change with time of the sensor output was investigated by analysis. Here, starting from a state immediately after a thermal stress (200° C., which is the hardening temperature of the resin adhesive) was applied to the pressure sensor S1, the change with time of the sensor output when the pressure sensor S1 was left in a room-temperature atmosphere was investigated.

As a result of carrying out this analysis, it was found that the required condition set as described above can be satisfied if the constant B is not greater than 3.5.

Figure 5:
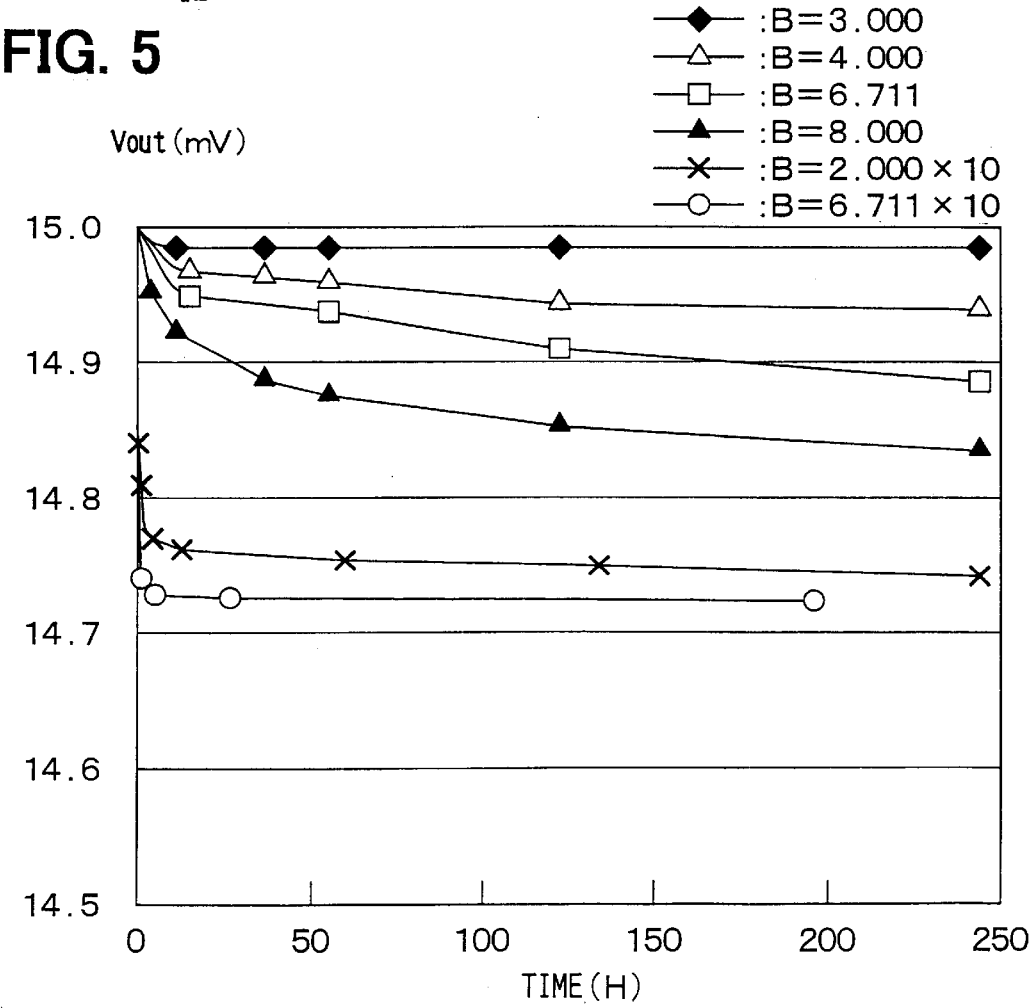
FIG. 5 is a graph illustrating changes of sensor output with time due to creep of a resin adhesive in the pressure sensor shown in FIG. 1.
Figure 6:
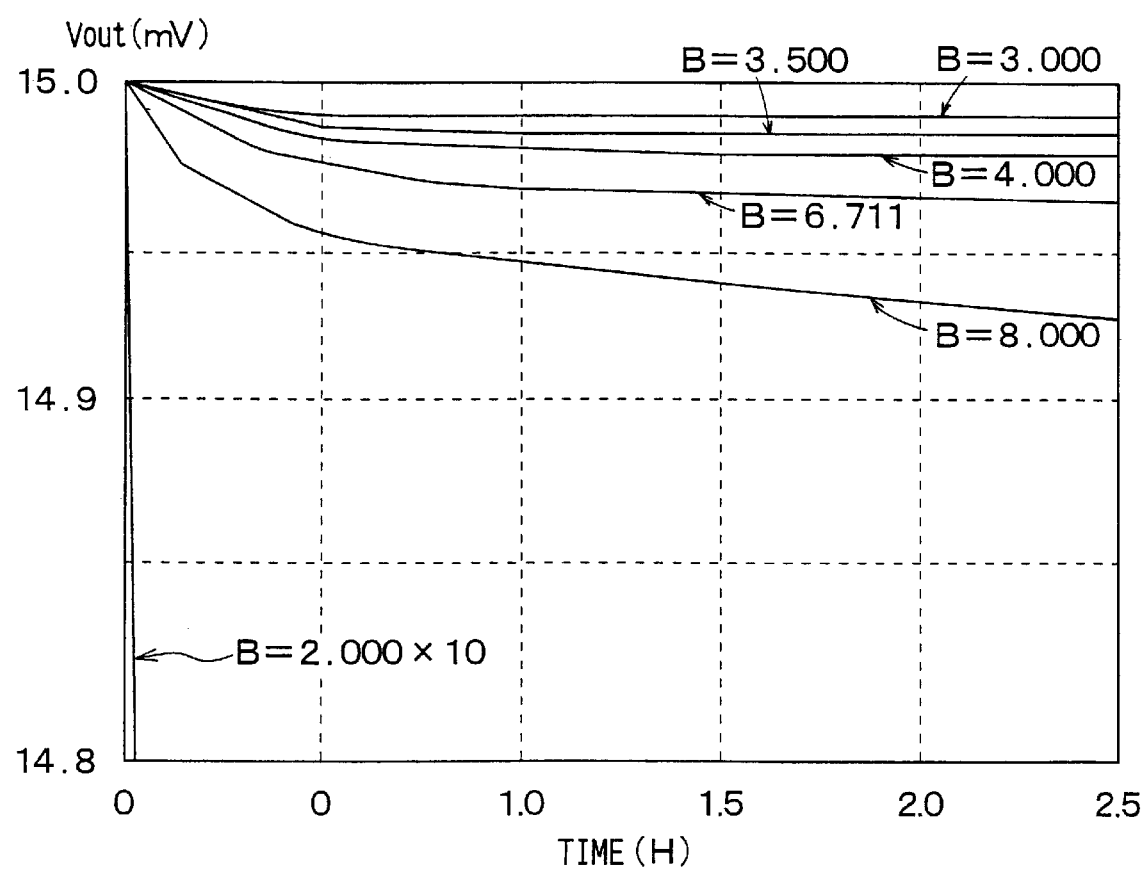
FIG. 6 is a graph illustrating in enlargement a part of the graph in FIG. 5.

An example of results of this analysis is shown in FIG. 5. In FIG. 5, the constant A is $10^{-10}$. FIG. 6 is an enlargement of the range in FIG. 5 of up to 2.5 hours after the application of the thermal stress. In these figures, the horizontal axis shows time (H) and the vertical axis shows sensor output (mV).

Here, in the case of constant B=3.5, although it is not shown in FIG. 5, even after 2.5 hours, the output is constant like the case of B=3.0 shown in FIG. 5. From FIG. 5 and FIG. 6, it can be seen that, if the constant B is 3.5 or below, the sensor output returns within two hours after the application of the thermal stress to the room-temperature sensor output of before the thermal stress was applied, and thereafter there is no output fluctuation and a constant sensor output can be maintained.

Further, as shown in FIG. 5 and FIG. 6, when the constant B is 4.0, 6.711, or 8.0, the sensor output fluctuates even after two hours from when the thermal stress was applied. When the constant B is large, at 20.0 or 67.11, the difference in sensor output between the high temperature (for example 200° C.) and room temperature is too large, which is opposite to maximally reducing sensor output fluctuation caused by temperature changes.

From the results shown in FIG. 5 and FIG. 6, it is clear that a small constant B is preferable, and the resin adhesive 40 having a creep characteristic such that the constant B is below 3.0 can realize to a high level the effect of maximally reducing sensor output fluctuation caused by temperature changes. A trend similar to those of FIG. 5 and FIG. 6 is obtained irrespective of the constant A (below $10^{-7}$).

Because in this preferred embodiment the sensor chip 10 and the metal stem 20 are suitably bonded together using the resin adhesive 40 having a lower bonding temperature than a low melting point glass resin used in related art, it can be applied effectively even to a sensor element with a relatively low resistance to heat, such as the sensor chip 10 with the integrated piezo-resistors 50 and circuit part 60.

Because of the low heat resistance of the transistor elements and the like constituting the circuit part, a sensor element with which a circuit part is further integrated (an integrated sensor chip) is less resistant to heat than a sensor element (discrete type) having only piezo-resistors, and bonding integrated sensor chips has been problematic with the low melting point glass in the related art.

The hardening temperature (bonding temperature) of the resin adhesive 40 is preferably below 200° C.; this is in consideration of the resistance to heat of the devices constituting the circuit part 60, such as MOS transistor devices and bipolar transistor devices.

In a pressure sensor, when there is a problem with the sensor output, output adjustment is carried out; and if at this time there is change with time of the sensor output, output adjustment cannot be performed. However, with this preferred embodiment, because sensor output fluctuation caused by temperature changes can be maximally reduced, this kind of problem can be prevented.

A pressure sensor according to the invention may of course be a discrete type, besides the integrated type described above. The metal stem may be one without a diaphragm, the invention being applicable to any pressure sensor having a pressure introduction passage for guiding a pressure to a sensor element.

What is claimed is:

1. A pressure sensor comprising:
    a sensor element for outputting a signal corresponding to an applied pressure;
    a stem bonded to the sensor element and supporting the sensor element; and
    a resin adhesive bonding the sensor element and the stem,
    wherein the resin adhesive has a creep characteristic such that, when its creep rate is defined as CR and its stress is defined as $\sigma$, its creep rate CR is given as $CR=A\times\sigma^B$ with A and B being constants, and
    wherein the constant B is not greater than 3.5.

2. A pressure sensor according to claim 1, wherein the constant B is not greater than 3.

3. A pressure sensor according to claim 1, wherein the resin adhesive comprises imide resin.

4. A pressure sensor according to claim 1, wherein the sensor element includes piezo-resistors integrated with a circuit part for processing the signal from the piezo-resistors.

5. A pressure sensor according to claim 4, wherein the circuit part includes at least one of a MOS transistor element and a bipolar transistor.

6. A pressure sensor according to claim 4, wherein the circuit part is for amplifying and for adjusting the signal from the piezo-resistors, and for outputting the signal from the piezo-resistors as a sensor output via interconnection members.

7. A pressure sensor comprising:
    a sensor element for outputting a signal corresponding to an applied pressure and comprised entirely of discrete components;

a stem bonded to the sensor element and for supporting the sensor element; and a resin adhesive having a bonding temperature lower than that of a glass resin for bonding the sensor element and the stem, wherein the resin adhesive has a creep characteristic such that, when its creep rate is defined as CR and its creep stress is defined as a, its creep rate CR is given as $CR = A \times \sigma^B$ with A and B being constants and B not being greater than 3.5 to reduce fluctuation caused by the creep stress in the signal output by the sensor element.

8. The pressure sensor of claim 7, wherein the sensor element comprises an automotive fuel injection pressure sensor element.

9. The pressure sensor of claim 7, wherein $0 < B \leq 3.0$.

10. The pressure sensor of claim 7, wherein the resin adhesive comprises an imide resin adhesive.

* * * * *